(12) United States Patent
Taylor

(10) Patent No.: US 8,739,239 B2
(45) Date of Patent: *May 27, 2014

(54) SIGNAL ACQUISITION APPARATUS AND METHOD

(75) Inventor: Mathhew Paul Athol Taylor, Ringwood (GB)

(73) Assignee: Sony Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 13/361,478

(22) Filed: Jan. 30, 2012

(65) Prior Publication Data

US 2012/0216237 A1 Aug. 23, 2012

(30) Foreign Application Priority Data

Feb. 18, 2011 (GB) .................................. 1102852.9

(51) Int. Cl.
*H04N 7/173* (2011.01)

(52) U.S. Cl.
USPC .......................................... 725/131; 725/105

(58) Field of Classification Search
USPC .......................................................... 725/131
See application file for complete search history.

(56) References Cited

U.S. PATENT DOCUMENTS

| | | | |
|---|---|---|---|
| 2007/0067813 A1 | 3/2007 | Yen | |
| 2008/0152018 A1 | 6/2008 | Ma et al. | |
| 2010/0226426 A1* | 9/2010 | Tupala et al. | 375/240.01 |
| 2011/0119568 A1* | 5/2011 | Jeong et al. | 714/790 |
| 2011/0167464 A1* | 7/2011 | Yun et al. | 725/114 |
| 2012/0155648 A1* | 6/2012 | Tupala | 380/287 |

FOREIGN PATENT DOCUMENTS

| | | |
|---|---|---|
| EP | 1 696 575 A1 | 8/2006 |
| EP | 2 285 057 A1 | 2/2011 |
| WO | WO 2007/048585 A1 | 5/2007 |
| WO | WO 2007/072348 A2 | 6/2007 |
| WO | WO 2007/072348 A3 | 6/2007 |

OTHER PUBLICATIONS

United Kingdom Search Report Issued Jun. 15, 2011, in Great Britain Patent Application No. 1102852.9, filed Feb. 18, 2011.
U.S. Appl. No. 13/304,572, filed Nov. 25, 2011, Taylor, et al.
Extended European Search Report issued Jun. 20, 2012, in Patent Application No. 12151994.6.
"Digital Video Broadcasting (DVB); Implementation guidelines for a second generation digital terrestrial television broadcasting system (DVB-T2)", Draft ETSI TR 102 831, vol. 0.9.6, XP 017817721, Jan. 2009, pp. 1-195.

(Continued)

*Primary Examiner* — Jeffery Harold
*Assistant Examiner* — Justin Sanders
(74) *Attorney, Agent, or Firm* — Oblon, Spivak, McClelland, Maier & Neustadt, L.L.P.

(57) ABSTRACT

A receiver comprises a first signal acquisition unit for acquiring a first type of signal block formatted according to a first format, wherein the first type of signal block is interleaved with a second type of signal block formatted according to a second format. The first signal acquisition unit includes one or more parameter estimation units for estimating, from received signals of the first type, one or more signal parameters related to acquisition of the first type of signal block at a respective frequency; memory to store data relating to the or each estimated parameter for the respective frequency; and a controller configured to initialize parameter estimation for subsequent received signals on a revisited frequency based upon data stored for that respective frequency.

20 Claims, 7 Drawing Sheets

(56) References Cited

OTHER PUBLICATIONS

"Digital Video Broadcasting (DVB); Frame structure channel coding and modulation for a second generation digital terrestrial television broadcasting system (DVB-T2)", Draft ETSI EN 302 755, V1.1.1, Apr. 2008, pp. 1-164.

Erik Stare, "T2-compatible FEF modes", Oct. 18, 2010, pp. 1-13.

* cited by examiner

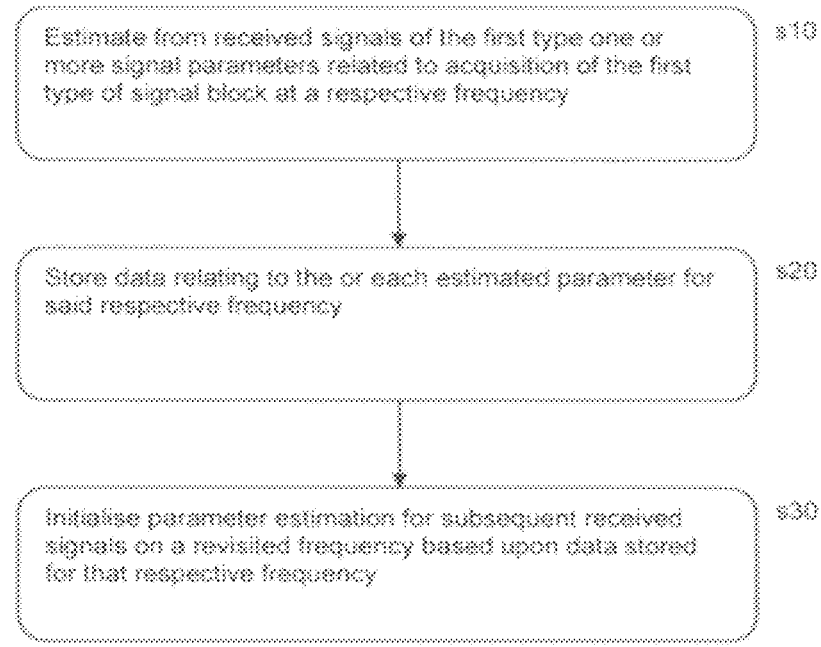

SIGNAL ACQUISITION APPARATUS AND METHOD

BACKGROUND OF THE INVENTION

1. Field of the Invention

The present invention relates to a signal acquisition apparatus and method and a signal transmission apparatus and method.

2. Description of the Prior Art

A number of Digital Video Broadcasting (DVB) standards have been proposed in recent times, such as DVB-T (terrestrial), DVB-T2 ($2^{nd}$ generation terrestrial), DVB-H (handheld, or mobile), DVB-S2 (satellite) and DVB-C2 (cable).

The different standards address different requirements specific to each kind of transmission/reception, such as terrestrial broadcasts, or broadcasts to handheld devices.

In the case of hand-held devices, both cost and power consumption are significant factors. Consequently a mobile device may only have one tuner available for receiving DVB signals.

In the case of a DVB signal adhering to a mobile standard in which the signal is intermittent and optionally also hops between different frequencies, this introduces the need to acquire the signal anew with each intermittent transmission.

Moreover, some DVB standards use orthogonal frequency division multiplexing, which requires certain information to be available to a receiver before any video data can be obtained from the remaining signal. This information is sometimes provided at the start of a transmitted data frame, for example in DVB-T2.

Consequently if a mobile device cannot acquire the DVB signal quickly enough to obtain this information, the rest of the data frame and the video information it contains remains inaccessible, resulting in reduced image quality.

Some DVB standards attempt to mitigate this problem by encoding this initial information in a robust manner that enables comparatively easy acquisition, but there is clear scope to improve upon this arrangement.

SUMMARY OF THE INVENTION

In a first aspect there is provided a receiver according to claim 1.

In a second aspect there is provided a method of reception according to claim 9.

Further respective aspects and features of the invention are defined in the appended claims.

BRIEF DESCRIPTION OF THE DRAWINGS

The above and other objects, features and advantages of the invention will be apparent front the following detailed description of illustrative embodiments which is to be read inconnection with the accompanying drawings, in which:

FIG. 7C is a schematic diagram of successive DVB-T2 frames in a time-frequency slicing scheme.

FIG. 8 is a flow diagram of a method of receiving data in accordance with an embodiment of the present invention.

DESCRIPTION OF THE PREFERRED EMBODIMENTS

A signal acquisition apparatus and method and a transmission apparatus and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Two DVB standards are DVB-T2 and the recently proposed so-called DVB-NGH (next generation handheld). DVB-NGH is intended to provide digital video for mobile devices.

Embodiments of the present invention assume that transmitted frames of DVB-NGH will be interleaved between transmitted frames of DVB-T2, enabling DVB-NGH to use existing terrestrial transmission infrastructure.

Figure 1:
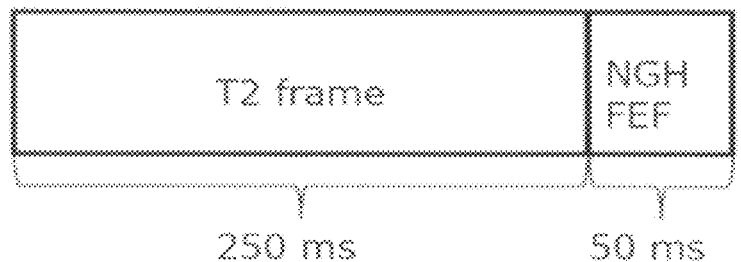
FIG. 1 is a schematic diagram of a DVB-T2 signal comprising a future extension frame.

Referring to FIG. 1, embodiments of the present invention assume that the DVB-NGH frame is or is part of a future extension frame (FEF). The FEF is an optional frame structure provided by DVB-T2. Thus the FEF could provide the frame structure for data transmitted in the DVB-NGH format, or provide a wrapper for a separate DVB-NGH frame. As DVB-NGH is expected to use a lower data rate, the frames will be of different lengths. Consequently it can be expected that, as a non-limiting example, a DVB-NGH frame of 50 ms duration may be interleaved with DVB-T2 frames of 250 ms duration.

However, it is undesirable to keep a tuner in a mobile device powered continuously in order to receive a signal that, in the above example, occupies only around ⅙ of the transmission time, and so one may expect that optionally such a tuner will be turned off between DVB-NGH frames. It will also be appreciated that for a mobile device, one or more of the signal parameters associated with acquisition of the DVB-NGH frames may change in the interim between frames, for example due to movement of the device. As a result the tuner may have to acquire the signal anew without knowing the current signal conditions. As noted previously, this can take a comparatively long time and so incurs the risk of missing the information required to subsequently decode the frame. One solution is to provide an initial guard interval in the DVB-NGH frame, but this reduces the frame capacity.

Figure 2A:
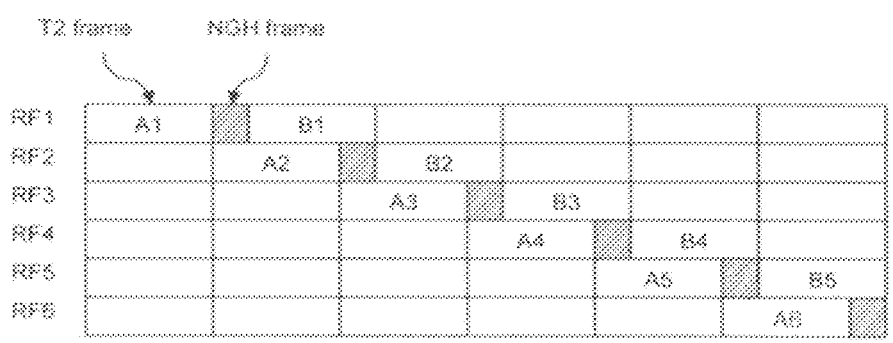
FIG. 2A is a schematic diagram of a time-frequency slicing scheme for interleaved signals of different formats.

In addition, referring to FIG. 2A an optional scheme for DVB-T2 is time-frequency slicing. In this scheme a there are a plurality so-called physical layer pipes (PLPs) providing time-multiplexed services (of which only services A and B are labelled for clarity) on a plurality of frequency bands RF1 . . . RFn. In the example of FIG. 2A, n=6, but it will be appreciated that in practice the number of bands may differ. The signals are arranged so that an A-only or B-only service can be obtained by switching frequencies in a prescribed manner (e.g. in a simple cycle as shown in FIG. 2, or according to a predetermined or transmitted pattern). The DVB-NGH frames for a particular service (for example the mobile transmission equivalent to service A) are thus associated with a particular DVB-T2 encoded service and so also follows the frequency switching pattern.

Therefore the tuner in a mobile device may also potentially have to reacquire the DVB-NGH signal at switch-on from an entirely different frequency band. Thus again the tuner may not know at least some of the relevant signal parameters needed to acquire the signal, so delaying or further delaying acquisition of the signal.

The DVB-T2 and DVB-NGH standards have different data formats reflecting the different requirements of terrestrial and mobile receivers. However, both standards are based on OFDM encoding.

To facilitate detection and recovery of the audio/video data at a receiver, some OFDM communications systems, such as DVB-T2 and DVB-NGH, include signalling OFDM symbols to provide signalling information.

Signalling OFDM symbols are designed to facilitate detection of the signalling OFDM symbols by a receiver. For the example of DVB-T2, as described in "Digital Video Broadcasting (DVB); Frame structure channel coding and modulation for a second generation digital terrestrial television broadcasting system (DVB-T2)", Draft ETSI EN 302 755 V1.1.1, September 2009, a P1 signalling OFDM symbol is arranged to include a pre-amble guard interval and a post-amble guard interval, the pre-amble and the post-amble guard intervals being formed by copying samples from a useful part of the signalling OFDM symbol. A recommended technique for detecting the P1 OFDM symbol is disclosed in "Digital Video Broadcasting (DVB); Implementation guidelines for a second generation digital terrestrial television broadcasting system (DVB-T2)", Draft ETSI TR 102 831 V0.10.4, June 2010.

Figure 3:
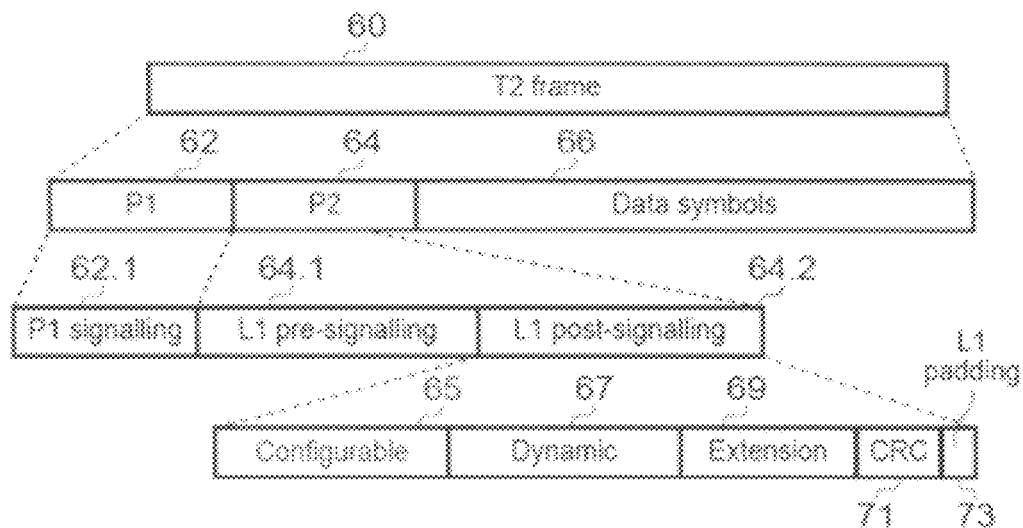
FIG. 3 is a schematic diagram of a DVB-T2 frame.

As shown in FIG. 3, the DVB-T2 frame 60 includes a P1 signalling symbol 62 and a P2 signalling symbol 64 as well as other OFDM symbols 66 for carrying data. FIG. 3 also illustrates the L1 signalling data structure which is provided by the P1 and P2 62, 64 symbols. As shown in FIG. 3, the P1 symbol 62 includes P1 signalling data 62.1 whereas the P2 symbol 64 includes in two parts L1 signalling data which is provided in a pre-signal 64.1 and a post-signal 64.2. The L1 post signalling data is shown to provide several data fields including configurable data 65, a dynamic field 67, an extension field 69 and a cyclic redundancy check field 71 as well as padding symbols 73.

Whilst not shown, the DVB-NGH frame is also expected to comprise one or more signalling OFDM symbols similar to those described above for DVB-T2, but providing information relating to the different data format of DVB-NGH.

Figure 4A:
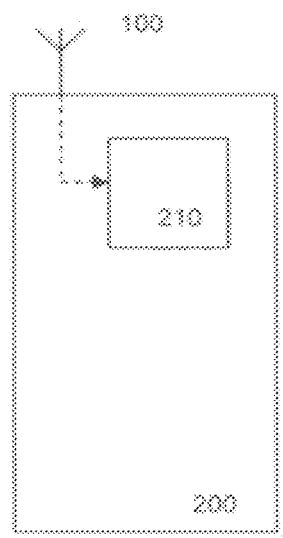
FIG. 4A is a schematic diagram of a mobile device comprising a receiver in accordance with an embodiment of the present invention.

Turning now to FIG. 4A, a mobile device 200 may comprise a receiver 210 suitable to acquire DVB-NGH OFDM signals via an antenna 100.

Figure 4B:
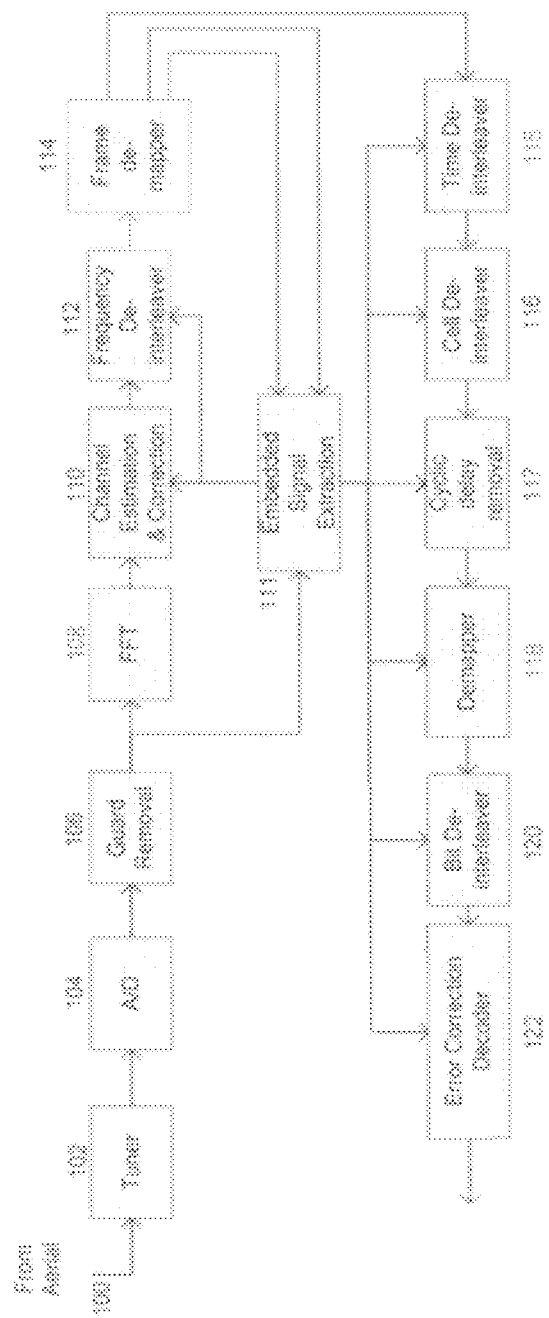
FIG. 4B is a schematic diagram of components of a receiver in accordance with an embodiment of the present invention.

As shown in FIG. 4B, a DVB-NGH OFDM signal is received by an antenna 100 and detected by a tuner 102 before being converted into digital form by an analogue-to-digital converter 104. A guard interval removal processor 106 removes a guard interval from a received OFDM symbol, before modulation symbols representing the data are recovered from each received OFDM symbol using a Fast Fourier Transform (ITT) processor 108 in combination with a channel estimator and corrector 110 and an embedded-signalling extraction (decoding) unit 111. The modulation symbols are fed to a frequency de-interleaver 112, which performs a reverse mapping between the modulation symbols and the OFDM symbol sub-carriers to form a stream of modulation symbols from each of the OFDM symbols. A frame de-mapper 114 then separates the modulation symbols transmitted in different frames of the time division multiplexed structure of the OFDM transmission interface into logical channels, which are then time de-interleaved by a time de-interleaver 115 and then a further deinterleaver called a cell de-inteaeleaver 116. A cyclic delay removal unit 117 then removes a cyclic shift if introduced into the data at the transmitter. The demodulated data is then recovered from a de-mapper 118 from the modulation symbols and to produce for each channel a bit stream. A bit de-interleaver 120 then reverses any bit interleaving in the signal. Finally an error correction decoder 121 is arranged to correct errors and recovers an estimate of the source data.

To perform the above functions the receiver is responsive to at least one and typically several properties or parameters of the signal. These include but are not limited to:
- the power of the signal
- the timing offset of the signal
- the frequency offset off the signal;
- the noise profile of the signal;
- the FFT trigger position; and
- the frequency interpolation filter position.

A typical data acquisition sequence is described below, which may be applied to either DVB-T2 or DVB-NGH.

First, the tuner must be tuned to the correct RF frequency. For a signal which uses Time Frequency Slicing (TFS) the tuner needs to tune to one of the frequencies RF1 . . . RFn in the T2 System). This can be summarised by the table below, which notes that the frequency and bandwidth information are pre-requisites for obtaining further information:

| Pre-requisites | Information that can be Determined |
| --- | --- |
| RF Frequency | |
| Bandwidth | |

Next the automatic gain control (AGC) loop can lock at that particular frequency and channel bandwidth, as summarised below.

| Pre-requisites | Information that can be Determined |
| --- | --- |
| RF Frequency | AGC lock |
| Bandwidth | |

With AGC lock achieved at a particular frequency and channel bandwidth, the P1 symbol can be detected. When this is detected, the coarse timing offset is known. Processing can be carried out to determine the coarse frequency offset. The P1 symbol also contains signalling that enables the following to be determined:

| Pre-requisites | Information that can be Determined |
| --- | --- |
| AGC lock | coarse timing offset |
|  | coarse frequency offset |
|  | SISO/MISO |
|  | FFT size |

With the FFT size and coarse timing offset known, the guard interval detection process begins.

| Pre-requisites | Information that can be Determined |
| --- | --- |
| coarse timing offset | guard interval |
| FFT size |  |

With the FFT size and guard interval known, the guard interval correlation process can start. This enables an initial FFT triuzer point to be determined.

| Pre-requisites | Information that can be Determined |
| --- | --- |
| T2/FEF | initial FFT trigger point |
| FFT size |  |
| guard interval |  |
| coarse timing offset |  |

Once the P2 symbol has been demodulated, the L1-pre signalling can be decoded. This allows the information listed in the table below to be determined:

| Pre-requisites | Information that can be Determined |
| --- | --- |
| FFT size | confirmation of P1 signalled information |
| guard interval (1k-8k modes) | confirmation of guard interval |
| coarse timing offset | information necessary to decode L1-post |
| coarse frequency offset | information necessary to demodulate data symbols |
|  | information necessary to determine position in superframe and frame |

With the L1-pre signalling decoded, the positions of the continual pilots (the pilot pattern) are known. The fine timing and frequency offsets are now determined.

| Pre-requisites | Information that can be Determined |
| --- | --- |
| FFT size | fine timing offset |
| bandwidth | fine frequency offset |
| normal/extended |  |
| PAPR |  |
| pilot pattern |  |

Similarly, with the L1-pre signalling decoded, the channel estimation process can start. The channel estimate and noise profile can now be determined.

| Pre-requisites | Information that can be Determined |
| --- | --- |
| FFT size | channel estimate |
| bandwidth | noise profile |

| Pre-requisites | Information that can be Determined |
| --- | --- |
| normal/extended |  |
| PAPR |  |
| pilot pattern |  |

Similarly, with the L1-pre signalling decoded, a process to determine a position for the frequency interpolation filter can start.

| Pre-requisites | Information that can be Determined |
| --- | --- |
| FFT size | frequency interpolation filter position |
| bandwidth |  |
| normal/extended |  |
| PAPR |  |
| pilot pattern |  |

Also, with the fine timing and frequency offsets known, it is possible to decode the L1-post signalling.

| Pre-requisites | Information that can be Determined |
| --- | --- |
| fine timing offset | information necessary to decode PLPs |
| fine frequency offset | information necessary to navigate FEFs |

Following the above example acquisition sequence, the system will need to acquire the signal for each alternate frame in the interleaved transmission scheme. Of the above parameters, in particular the RF Frequency, Bandwidth, AGC lock value, initial FFT trigger point, coarse timing offset, fine timing offset, fine frequency offset and noise profile (channel estimate) may need to be re-estimated in a so-called 'power up' re-acquisition sequence. Such as sequence is similar to the above sequence, but may be shorter where certain information is assumed to remain valid from the previous acquisition sequence for that frame type.

Several of these parameters are discussed below.

The power of the signal is used to adjust an automatic gain control loop (not shown) prior to analog to digital conversion by the converter 104. As such it takes time for the gain control loop to converge on the signal power level, thereby introducing a delay before data from the signal can be reliably acquired. More generally, the gain control loop may be said to be a parameter estimation unit for estimating the power of the signal.

A coarse timing offset can be determined following AGC lock, whilst a fine timing offset of the signal is typically determined from the use of continuous pilot signals (i.e. a pilot signal pattern) within the OFDM transmission. The offset represents a disparity between the reference clock at the transmitter and the local clock at the receiver. Other non-OFDM transmission schemes may use signalling metadata that includes a reference clock timestamp. More generally, a unit or other logic (not shown) for comparing the reference time (or an estimate thereof) and local time or otherwise estimating the timing offset may be said to be a parameter estimation unit for estimating the timing offset of the receiver.

The frequency offset of the signal is likely to be different for each frequency RF1 . . . RFn in a time-frequency slicing scheme, and may also vary slowly with time even on a single channel. Again, a frequency control loop or similar (not shown) takes a finite amount of time to converge on the received centre frequency from the expected centre frequency. More generally, such a control loop may be said to be a parameter estimation unit for estimating the frequency of the signal. In an OFDM transmission scheme, it may also be necessary to obtain information about the FFT size and pilot signal pattern from a signalling OFDM symbol or similar metadata to finely estimate frequency or frequency offsets. Meanwhile a coarse estimate of frequency or frequency offsets may be possible following AGC lock.

The noise profile of the signal in an OFDM transmission scheme typically requires knowledge of the pilot signal pattern within the data being transmitted, and hence also requires data from a signalling OFDM symbol or similar metadata, either explicitly providing the pilot pattern, or where this is predetermined, providing timing and FFT size data to enable pilot signal tracking. More generally a noise profile estimator (such as channel estimator and corrector 110) may be said to be a parameter estimation unit for estimating the channel noise profile.

Other parameters relating to the signal may also be similarly estimated by respective estimation units (not shown), such as the FFT trigger position, and the frequency-interpolation filter position.

It will be appreciated that the time taken to estimate the signal power and adjust automatic gain control, and potentially also to estimate the frequency offset and other parameters, imposes an effective delay upon when the receiver can obtain data from the signal in an acceptably reliable way and thus be said to have 'acquired' the signal. As noted above, such a delay can result in the failure to acquire the initial data needed to decode an entire frame of video data, so reducing performance. In signal formats where there is no initial signalling data, it will nevertheless be appreciated that the first part of that signal (for example early payload data) would be similarly missed, thereby also reducing performance.

Figure 5A:
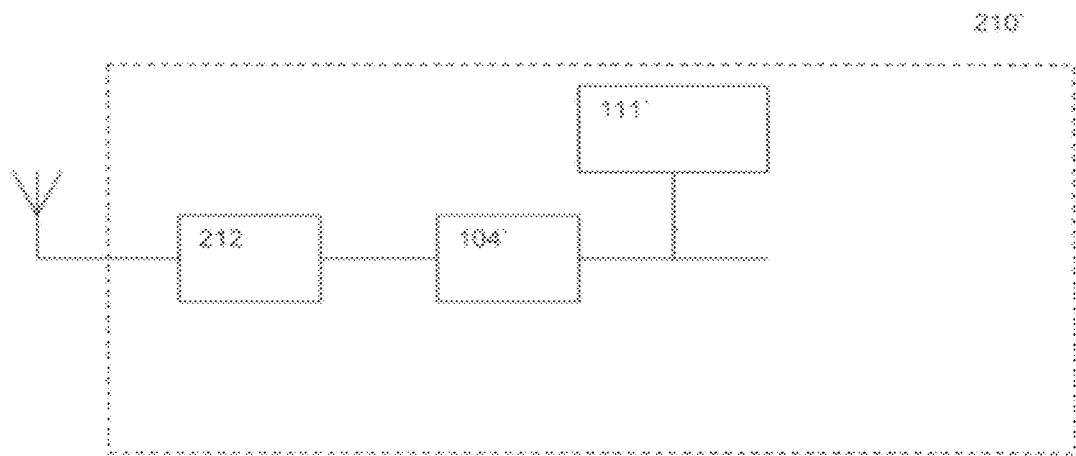
FIG. 5A is a schematic diagram of components of a receiver in accordance with an embodiment of the present invention.

Consequently, referring now to FIG. 5A, in an embodiment of the present invention a receiver 210' comprises a first acquisition unit (for example collectively a gain controller 212, A/D converter 104', and signal extractor 111') for acquiring a first type of signal block formatted according to a first format, such as for example a DVB-NGH signal in an FEF frame. Other components such as those shown in FIG. 4B may be included if applicable for acquiring the particular signal format and will be known in the art.

In this example, the gain controller is operable as a parameter estimation unit for estimating the power of the received signal.

Optionally other controllers and estimators as described above may estimate one or more further parameters. These will be discussed in more detail later herein.

As noted above, the DVB-NGH frame is interleaved between DVB-T2 frames of data. Notably the two different data formats therefore share a transmitter and (to within a short time period) similar channel conditions.

Accordingly, in an embodiment of the present invention the gain controller (or other parameter estimation unit) for the DVB-NGH receiver initialises its control loop (or other parameter estimation) process based upon the DVB-T2 signal that is available prior to the intended or target DVB-NGH signal. As a result the parameter estimation units can estimate parameters (such as signal power) that are likely to be closely related to those of the intended signal before the intended signal is received.

Consequently the time required to make any fine adjustment in parameter estimation (such as in gain) between the estimate based upon the preceding DVB-T2 signal and the estimate based upon subsequent DVB-NGH signal will typically be much shorter than if the gain controller (or other parameter estimation unit) was initialised only at the start of the DVB-NGH signal.

Advantageously, this reduction in parameter estimation time can provide a commensurate reduction in the time taken until the receiver can properly acquire the DVB-NGH data.

Thus more generally, where a first type of signal block (e.g. DVB-NGH frames) formatted according to a first format is interleaved with a second type of signal block (e.g. DVB-T2 frames) formatted according to a second format, one or more parameter estimation units from a first acquisition unit arranged to receive signal blocks of the first type are arranged in operation to initialise signal parameter estimation based upon one or more respective properties of the received second type of signal block, prior to completion of the estimation based upon one or more respective properties of the received first type of signal block (i.e. fine-tuning of the estimate upon arrival of the DVB-NGH data).

Put another way, parameter estimations based upon the second signal type can be used to predict corresponding parameter values for the first signal type.

Thus a modified acquisition process for the DVB-NGH frame may use steps already conducted for the DVB-T2 acquisition sequence to estimate one or more of the parameters described above.

Optionally other information items may be similarly estimated or obtained from either the DVB-T2 power-up sequence or the first DVB-T2 acquisition sequence as applicable, such as:

P1 Detection and Decoding—this can be done as an early check that the signal strength has not changed (if P1 is not detected, it indicated signal loss)

Guard-Interval Detection—typically this only needs to be done once. It will be appreciate that this is only relevant if the guard interval of the two formats (e.g. DVB-T2 and DVB-NGH) use the same guard interval.

L1-pre Signalling Decoding—again this can be done to check signal integrity and to check that there are no other changes to the DVB-T2 data.

L1-pre Signalling Decoding—Once the fine timing and frequency offsets are known, it is possible to decode the L1-post signalling as described above, to help navigate the FEF. Notably the L1-post signalling can change between DVB-T2 frames.

Optionally, some data may be continuously monitored or tracked after the DVB-T2 power-up sequence, such as continual pilot correlation, where the fine timing and frequency offsets are tracked; channel estimation, which can be an ongoing process, as can be the estimation of the frequency interpolation filter position. As will be described in more detail below, one or more of these ongoing data monitoring activities can be continued after a DVB-T2 frame, into and throughout the intervening DVB-NGH frame, to maintain a tracking of these parameters, and potentially also assist with the acquisition of the next DVB-T2 frame.

Further optionally, where there is a repeated disparity between the initial estimate of a parameter from the second signal type and the final estimate from the first signal type, that disparity can be factored in to the estimate at the point where the signal block of the first type begins. So, for example, if the second signal type is consistently 3 dB less powerful than the first signal type, then 3 dB can be added to the power level measured from the second signal type. This may be implemented for example by use of a rolling average of parameter disparity between second and first signals over a plurality of frames. Alternatively if the disparity is the result of a known difference in standards, then compensating for the standards-based disparity may be performed as an alternative or in addition to a disparity measure such as that described above. Alternatively or in addition, the disparity could be explicitly signalled, for example in either or both of the T2 and NGH frames, for example in L1 pre-signal 64.1 of FIG. 3.

It will be appreciated that in principle the above techniques would also assist acquisition of DVB-T2 signals by a DVB-T2 receiver that initiated parameter estimation during a preceding DVB-NGH frame, as will be described further later herein.

Thus more generally the approach is suitable for any interleaved signals of two different formats or standards, where the receiver is nominally designed to receive one format or standard but is arranged in accordance with an embodiment of the present invention to initialise signal property estimations from signals belonging to the other format or standard.

For a time-frequency slicing scheme of the type noted previously, the first acquisition unit will switch reception frequency prior to acquiring each successive signal block of the first type. This allows the receiver to implement the above technique of pre-initialising parameters at each new frequency.

As noted above, some parameters of the DVB-T2 signal may require decoding of some or all of a DVB-T2 frame, such as signalling OFDM symbols.

In the case where the two signal formats are interleaved on a single channel, the DVB-T2 frame immediately preceding the DVB-NGH frame can be used.

Referring back to FIG. 2A, in the case where a service is time-frequency sliced over multiple RF frequencies, it can be seen for example that while the DVB-NGH frame 'A' on RF1 is being transmitted, the initial part of the DVB-T2 frame 'A' on RF2 is also being transmitted. Therefore a mobile device with only one tuner will be unable to access the start of this frame prior to acquiring the DVB-NGH frame 'A' on RF2, and hence cannot acquire the signalling OFDM symbols located at the start of the frame.

Where a receiver only has one tuner, in this case it may therefore be beneficial to store estimates of parameters for signals received on each receiving frequency (for example based upon the DVB-NGH frame itself), and use these to initialise one or more parameter estimation units prior to receiving the next DVB-NGH frame at that frequency. In this case, preferably time invariant (or slow varying) parameters such as timing offset and frequency offset may be stored in memory. However, in addition other properties such as channel noise estimation may also be stored in memory. In this case, the stored noise estimation may remain a good approximation of current conditions if the mobile device is stationary or moving slowly. Thus optionally the receiver can detect whether to use stored noise estimation data based either on an indication of speed (for example based on other received signals such as 3G or GPS signals if available) or based upon whether the disparity between of the stored estimate and the eventual estimate based upon the received frame exceeds a threshold for a predetermined number of received frames.

This approach can also be used for other parameters, such as power. In the case of power, because it is not necessary to decode the preceding frame this can still be estimated from a partial reception of the preceding frame; however having a stored estimate may enable in turn initialisation of this early estimate, thereby reducing the time to eventually estimate the power of the target signal even further.

It will be appreciated that whilst the above refers to storing DVB-NGH parameters, it may also be applied to storing DVB-T2 parameters. Thus more generally where signals of a first and second type are interleaved in the manner described herein, then parameters for either or both signal type may be stored as described above. Further details of this scheme are described later herein.

Figure 2B:
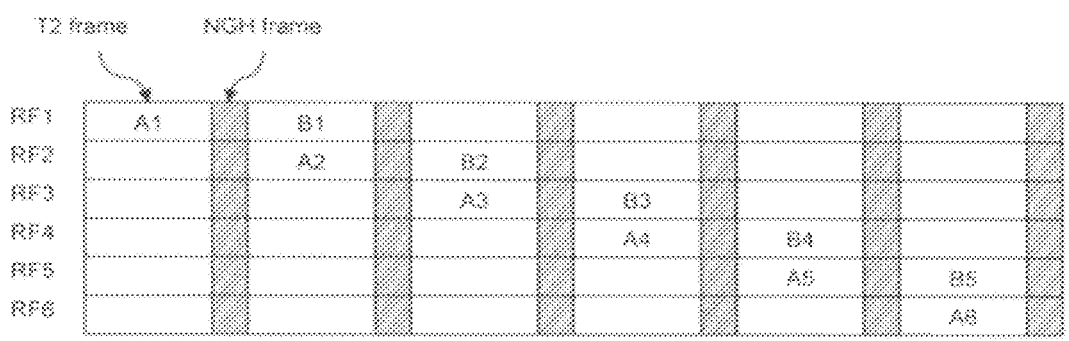
FIG. 2B is a schematic diagram of a time-frequency slicing scheme for interleaved signals of different formats.

In an alternative scheme illustrated in FIG. 2B (with similar features to FIG. 2A being similarly labelled), the DVB-T2 frames are time-aligned instead of being staggered. In this case, it is possible for a single tuner to switch to DVB-T2 frame 'A' on RF2 after receiving the DVB-NGH frame 'A' on RF1, and so the approach described previously may be applied to this time-slicing scheme. Alternatively or in addition, the above storage technique may also be used.

Figure 5B:
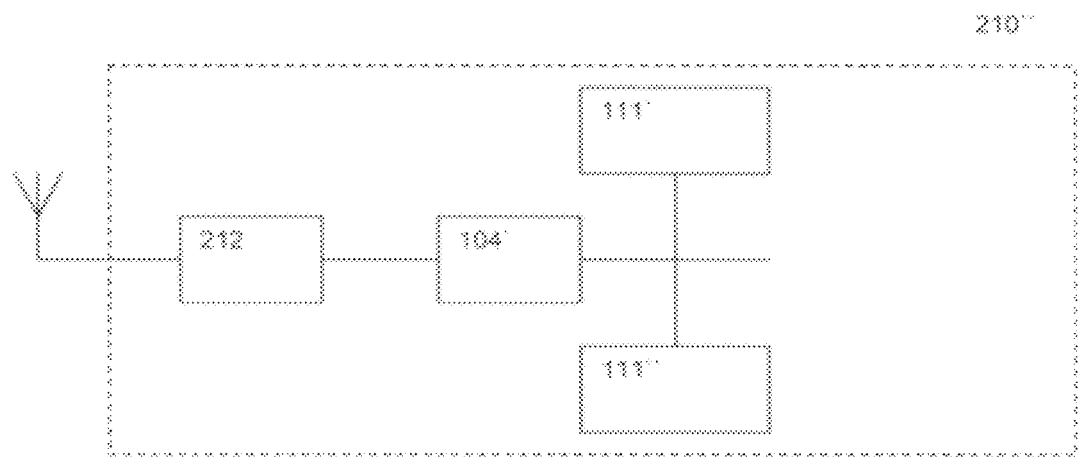
FIG. 5B is a schematic diagram of components of a receiver in accordance with an embodiment of the present invention.

Referring now to FIG. 5B, for the case where the two interleaved signals are transmitted on one channel, or where the receiver has two tuners and so can acquire a DVB-T2 frame preceding a DVB-NGH frame on a second channel, then in an embodiment of the present invention a receiver 210" includes a second signal acquisition unit for acquiring some or all of the DVB-T2 signal. In this case the second acquisition unit may for example share the gain controller 212 and A/D converter 104' of the first signal acquisition unit, and comprise a second signal extractor 111". Other arrangements (such as entirely separate gain controllers and A/D converter, or a single shared software configurable signal extractor) will be apparent to the skilled person. Again other components relevant to the particular signal format may also be included in a known manner.

In this case the second signal acquisition unit is operable to acquire, for example, signalling OFDM symbols from DVB-T2 frames that may provide direct information for parameter estimation such as timing data, and also information that enables analysis of data in the rest of the frame, such as FFT size, or optionally code rates and constellations. Based on such information for example a channel noise profile may be constructed. Where the FFT size of the DVB-T2 frame is different to that of the subsequent DVB-NGH frame, such a profile may be interpolated or decimated as applicable to the different resulting sub-carrier frequencies.

Thus more generally the second signal acquisition unit acquires at least part of the second type of signal, and comprises one or more parameter estimation units for estimating from the received signals one or more signal parameters related to acquisition of the second type of signal (for example a channel noise estimator, or a power estimator shared with the first signal acquisition unit); and the receiver initialises one or more parameter estimation units of the first signal acquisition unit with estimated parameters from one or more respective parameter estimation units of the second signal acquisition unit.

Notably the second signal acquisition unit may not comprise all the components necessary to fully decode the symbols in the DVB-T2 frame, as its primary purpose is to initialise the estimation of parameters for fine-tuning by the first signal acquisition unit. Thus more generally the receiver may not comprise means to decode the second type of signal block to the extent that it can be output as an audio or video signal, for example.

Thus more generally the receiver may comprise means to fully decode signals of the first type only, but also comprise means to decode signals of the second type to the extent required to obtain one or more desired parameter estimations.

It will be appreciated that the first and second signal acquisition units may share components or may be primarily software controlled implementations of such units on a general processor. In these circumstances, the means to decode signals of the second type to an extent required to obtain one or more desired parameter estimations may take the form of a limitation imposed by a control of the receiver, such as only implementing a sufficient portion of software to decode signals to the required extent, and/or may involve discarding unrequired outputs of such a decoding process.

Whilst signalling symbols such as P1 or P2 are found in OFDM systems, other transmission standards may use other schemes and so more generally such symbols, preamble, or training symbols for a receiver or other such data may be considered as 'header' data or metadata comprising information items that describe properties relating to a payload portion of a signal.

It will be appreciated that where it is possible to obtain a parameter estimate or information that leads to a parameter estimate from only a portion of the preceding frame, then the receiver can power down the first signal acquisition unit between signal blocks of the first type (DVB-NGH), and then for example power up the first signal acquisition unit at a predetermined time preceding the next signal block of the first type. In this way the receiver can obtain for example power estimates immediately preceding the target frame without having to use energy receiving unwanted data from the preceding frame.

For data formats that enable decoding of such information from partial frame reception, it may also be possible to maintain power after reception of a target frame of the first type to obtain the header or metadata of the following frame of the second type, then power down for the majority of the frame before powering up to initialise signal power estimates as described herein. Where the format of the second signal type permits, estimation of characteristics such as an approximation of channel noise may also be possible from the latter part of the frame preceding the target frame.

As noted above, certain multiplexing schemes such as time-frequency slicing may make acquisition of data from the second signal type difficult. Another situation where this may be difficult is in high mobility scenarios, such as on a train or in a car, or more generally where the second signal type is not suited to the reception conditions expected for the first signal type.

For example, DVB-NGH is designed to be more robust than DVB-T2 to accommodate poorer and more rapidly fluctuating reception conditions. As a result it is possible that in some circumstances a DVB-NGH signal can be acquired whilst a DVB-T2 signal cannot.

In these circumstances a similar approach to that proposed for time-frequency slicing may be adopted, of storing parameters in memory between DVB-NGH frames in order to initialise parameter estimation prior to the next DVB-NGH frame. Notably however even in these circumstances the estimation of signal power from the DVB-T2 signal is still possible as it does not require access to metadata associated with the DVB-T2 frame.

It will be appreciated, however, that in conditions where acquisition of DVB-T2 is difficult, then the roles of DVB-T2 and DVB-NGH as described herein may be reversed so that the DVB-NGH frame provides a more robust source of power, timing, frequency shift and/or noise profile parameter estimates prior to acquisition of the next DVB-T2 frame.

Similarly, in an embodiment of the present invention where the receiver is primarily directed to receiving the DVB-T2 frame, it is possible using the principles described herein to maintain or track various parameter estimates relevant to the DVB-T2 signal during the intervening FEF/DVB-NGH signal. In this case there is therefore an on-going estimation process that hands over between the two formats of signal, instead of (or in addition to) initialising an estimation process with one format prior to handover to the second format as described above.

For example it would be preferable to be able to continuously track the frequency offset, timing offset, AGC level, channel estimate, and noise profile for a DVB-T2 signal, but the inclusion of a DVB-NGH signal in the FEF makes the DVB-T2 signal discontinuous.

As a non-limiting example, some of these parameters are estimated with the use of pilot signals. In the scenario described above, the intervening FEF signal will also have pilot signals that can be used to maintain or track these estimations. It is likely that the DVB-NGH pilots will be have the same frequency spacing as the main DVB-T2 signal even if for example, the FFT sizes are different, because the pilot frequency spacing is determined by the characteristics of the radio channel, which will be the same for both signals. Even if the pilot spacing is different in frequency or time then it would still be possible to use them, for example by independently determining one or more parameters from the intervening signal and then using that parameter to maintain the tracking of the corresponding parameter of the main signal using a predetermined or empirical relationship.

It will be appreciated that for the above example it is necessary to acquire some data from the FEF, and so the parameter estimates from the DVB-T2 frame can also be used to improve acquisition of the FEF data in the manner previously described herein.

Thus more generally, one or more parameter estimation units are arranged in operation to conduct signal parameter estimation based upon one or more respective properties of the received second type of signal block prior to continuation of the estimation based upon one or more respective properties of the received first type of signal block.

Where this is done to initialise the DVB-NGH parameters based on DVB-T2 signals, then the or each parameter estimation unit for the DVB-NGH parameters are initialised based on the DVB-T2 signals, and the estimates are fine-tuned and completed during DVB-NGH acquisition; as noted above, by initialising the parameters using the DVB-T2 signal, the approximate values obtained are typically close to being correct and so require much less time to lock when acquiring the DVB-NGH signal. As noted herein, the converse situation of using DVB-NGH signals to initialise DVB-T2 acquisition is also possible.

Alternatively or in addition, where the one or more parameter estimation units are arranged in operation to conduct signal parameter estimation in order to track one or more parameters between frames of a first type across frames of a second type, then the parameter estimation from the preceding block of the first type typically continues as described herein during reception of the immediately preceding block of the second type, before continuing on during acquisition of the current block of the first type. It will be appreciated that such estimates may assist with the acquisition of each frame of either type.

Figure 6:
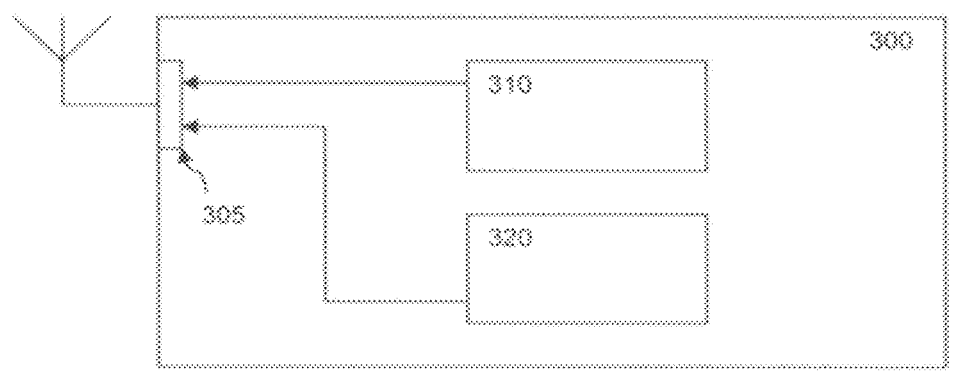
FIG. 6 is a schematic diagram of a transmitter in accordance with an embodiment of the present invention.

Referring now also to FIG. 6, in an embodiment of the present invention, the transmitter transmitting the interleaved first and second signal types is arranged to simplify initialising the estimation of signal parameters for the first signal type.

In an embodiment of the present invention, the transmitter adjusts transmission power to maintain a fixed power relation between the two signal types. This power relation may be based on average power or some other power measure such as RMS. The fixed relation may be to maintain similar power levels between the signal types or to maintain a power offset (for example 3 dB) between the signal types, to within a predetermined tolerance.

Where the transmitter provides this facility, then either the power estimate from the preceding signal will be very close to correct for the first signal, or as noted above the receiver can reliably compensate for any consistent disparity between the power of the second and first signals during the initialisation of the power estimate for the first signal.

It will be appreciated that other properties of the first and second signal types may also be adjusted by the transmitter in a similar manner; for example in a non-OFDM transmission scheme where the two signals are generated by separate encoders they may have different reference clocks; in such a case, the transmitter may inspect and adjust reference time stamps from one encoder to be consistent with the actual transmission timing with respect to reference time stamps from the other encoder.

In addition, the transmitter may insert data indicating information about data of one format within fields of data of the other format. For example (and as noted previously above) a power disparity between DVB-T2 and DVB-NGH frames could be explicitly signalled, for example in either or both of the T2 and NGH frames, for example in L1 pre-signal 64.1 of FIG. 3.

Thus more generally, the transmitter 300 will comprise a first transmission unit 310 (e.g. RF frequency modulator, D/A converter, and/or a first encoder, not shown) arranged to send to a transmission output 305 a first signal block formatted according to a first format, and also a second transmission unit 320 (e.g. a RF frequency modulator and D/A converter shared with the first transmission unit, and/or a second encoder, not shown) arranged to send to the transmission output a second signal block formatted according to a second format. In addition, it comprises a controller arranged to interleave the signal blocks of the first and second format and to adjust for one of the signal blocks a common property of the first and second signal blocks (such as power, or timing) to maintain a fixed relation between the values of this property in the first and second signal blocks, to within a predetermined tolerance.

As noted above, in embodiments of the present invention, parameters relating to one or both types of signal in the interleaved transmission may be stored to assist with initialising acquisition of that type of signal again.

As noted above, this is of particular benefit where the two signals are transmitted in a time-frequency slicing scheme.

Referring now for clarity to DVB-T2, in a TFS scheme sub-slices of a physical layer pipe (PLP) are sent over multiple RF frequencies during the T2-frame. The structure of the T2-frame in these circumstances is similar to that used when only transmitting on one RF channel, except for a few differences:

For so-called 'type 2' data PLPs, the sub-slices are distributed over all RF channels during one T2-frame. Meanwhile P1 symbols, L1 signalling and common PLPs are repeated simultaneously on each RF channel, to ensure availability while receiving any type 2 data PLP.

For so-called 'type 1' data PLPs, each type 1 data PLP only occurs on one RF channel in one T2-frame but different type 1 data PLPs are transmitted on different RF channels. The RF channel for a type 1 PLP may change from frame to frame (inter-frame TFS) or may be the same in every frame (Fixed Frequency) according to an L1 configurable signalling parameter FF_FLAG.

It is expected that DVB-T2 may use either type 1 or type 2 PLPs, whilst DVB-NGH will only use type 1 PLPs.

It will be understood that 'type 1' and 'type 2' above do not relate to the signal blocks of the first and second type referred to elsewhere herein.

In an example TFS system, a T2-frame starts at the same point in time on all RF channels, i.e. in all transmitters. This means that the P1 symbols occur at the same point in time on all RF channels, followed by the P2 symbol(s) and data symbols. Meanwhile, the addressing scheme for the data cells is applied to each RF channel individually exactly as for the single RF case.

Figures 7A, 7B:
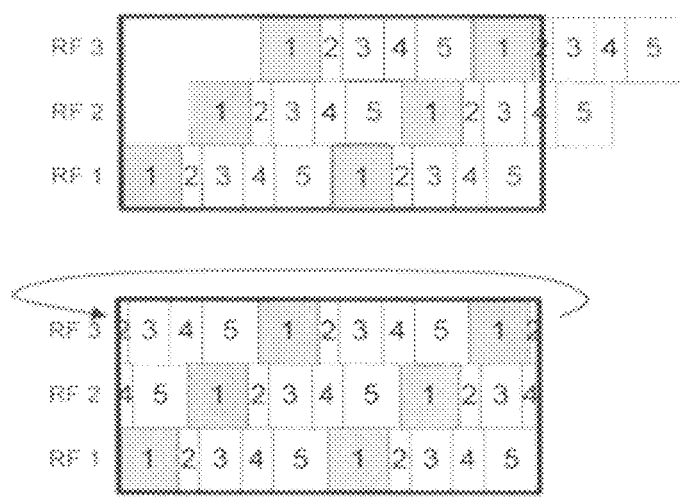
FIG. 7A is a schematic diagram of DVB-T2 frames in a time-frequency slicing scheme.
FIG. 7B comprises schematic diagrams of a DVB-T2 type 2 physical layer pipe in a time-frequency slicing scheme.

The structure of a T2-frame in TFS is shown in FIG. 7A. In effect, as noted above, the P1 and L1 symbols, any common PLPs are transmitted simultaneously on all RF channels, whilst respective type-1 PLPs are transmitted simultaneously on respective RF channels. Meanwhile type-2 PLPs are time-frequency sliced and shifted in relation to each other on the different RF channels to enable jumping between the RF channels during a T2-frame.

The structure of the type-2 PLP is shown in FIG. 7B for three illustrative RF frequencies. The upper figure of FIG. 7B shows how sub-slices are arranged so that, for example, sub-slices of PLP #1 can be tracked successively over the RF frequencies. The lower figure shows how this arrangement of sub-slices is then wrapped around within the type-2 PLP structure.

Whilst within one frame, the data required to switch between frequencies is available and so the system can track the sub-slices. Notably, there is a short time interval between sub-slices of PLP#1 on each RF frequency that facilitates this process. However, referring now to FIG. 7C, when moving from one frame to the next, there is a jump from the final frequency in one frame to a new frequency in the next frame without a significant time interval. In DVB-T2 this can be achieved by using two tuners. In DVB-NGH, the problem is avoided by use of type 1 PLPs.

However, in either case, certain parameters of the DVB-T2 or DVB-NGH signal vary with each RF frequency, but it is preferable for a DVB-T2 or DVB-NGH receiver to have fully acquired the DVB-T2 or DVB-NGH signal by the start of the next DVB-NGH frame or DVB-T2 sub-slice. Otherwise, in the case of the DVB-NGH signal, there needs to be either some guard time at the start of the DVB-NGH frame to allow for acquisition (which would result in a loss of capacity) or in the case of both signal types some loss of performance will result, which is caused by the receiver not having fully acquired the signal at the start of the DVB-NGH frame or relevant DVB-T2 sub-slice.

This therefore requires rapid acquisition of the signal for the next frequency, and hence good estimations of the signal parameters at that frequency. It will be appreciated that knowledge of the conditions at a particular RF frequency from the previous frame can assist with this process.

However, where there is an interleaving signal, such as a DVB-NGH signal in a FEF, it becomes more difficult to acquire the new frame since the preceding frame is from a different standard.

Therefore in an embodiment of the present invention, as noted previously, the receiver is arranged to store in a memory for one or both signal types (DVB-T2 and DVB-NGH) data relating to one or more signal parameters or the state of one or more internal processes for each RF frequency in the time frequency slicing scheme for that signal type.

For a DVB-T2 signal, a receiver could store such signal parameters as, for example:
   the power of the signal
   the frequency offset off the signal
   the timing offset of the signal
   the noise profile of the signal For a DVB-NGH signal, a receiver could store such signal parameters as, for example:
the frequency offset off the signal
the timing offset of the signal
Optionally, in DVB-NGH the power or noise profile of the DVB-NGH signal can also be stored, but when the receiver is used in a mobile environment, it is likely that these parameters will change significantly between DVB-NGH frames.

Alternatively or in addition, a DVB-T2 or DVB-NGH receiver can store the state of various internal processes for each RF frequency, these states being related to (and therefore representing the values of) signal parameters such as those listed above.

Then, when a respective RF frequency is revisited, a controller of the receiver can use the stored data for a signal type to initialise parameter estimates for subsequent received signals of that type on that revisited frequency, thereby improving the acquisition speed of the receiver for the new frame.

It will also be appreciated that the above storage techniques may also be used to further improve the signal parameter estimation techniques described herein, based upon the stored data for the preceding frame of the other type, particularly but not limited to the case where the signals are only transmitted on one radio frequency. For those parameters that are typically time varying within the time period of the two interleaved frames, it may be the case that such stored parameters for the immediately preceding frame of the different type may be more accurate (subject to any required interpolation or decimation) than older stored parameters for the earlier preceding frame of the same type. Hence, one or more stored parameters from a frame of a second type may be used to initialise estimates of those parameters for a frame of a first type in a similar manner to the real time estimates of those parameters described previously herein.

Referring now to FIG. 8, a method of receiving a first type of signal formatted according to a first format, wherein the first type of signal block is interleaved with a second type of signal block formatted according to a second format, comprises:

In a first step s10, estimating from received signals of the first type one or more signal parameters related to acquisition of the first type of signal block at a respective frequency;

In a second step s20, storing data relating to the or each estimated parameter for said respective frequency; and In a third step s30, initialising parameter estimation for subsequent received signals on a revisited frequency based upon data stored for that respective frequency.

It will be apparent to a person skilled in the art that variations in the above method corresponding to operation of the various embodiments of the apparatus as described and claimed herein are considered within the scope of the present invention, including but not limited to:
the first type of signal being a terrestrial digital video broadcast, and the second type of signal is a mobile digital video broadcast;
the first type of signal being a mobile digital video broadcast, and the second type of signal is a terrestrial digital video broadcast;
the data relating to the or each estimated parameter comprising the data relating to the state of one or more processes of a receiver;
a step of initialising an estimate of one or more signal parameters for a respective frequency for a signal of the second type using data stored for a respective frequency for a signal of the first type;
a step of receiving the interleaved signals of both the first and second types from successive ones of a plurality of frequencies; and
a step of extracting from the signal block of the first type a sub-block of data corresponding to respective service.

It will be appreciated that whilst reference has been made herein to DVB-T2 and DVB-NGH signal formats, the above techniques and principles are applicable to other combinations of signals with different formats where one or more parameters of one of those different formats provide an approximation of corresponding parameters of the other of those different formats that result in a shorter acquisition time for the other different format.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a non-transitory data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

I claim:

1. A receiver, comprising:
first signal acquisition circuitry configured to acquire a first type of signal block formatted according to a first format, wherein the first type of signal block is interleaved with a second type of signal block formatted according to a second format, the first signal acquisition circuitry including:
parameter estimation circuitry configured to estimate, from received signals of the first type, one or more signal parameters associated with acquisition of the first type of signal block at a frequency;
memory to store data relating to each said estimated one or more signal parameters associated with acquisition of the first type of signal block for said frequency; and
control circuitry configured to initialize signal parameter estimation for subsequent received signals at a revisited frequency based on the stored data relating to each said estimated one or more signal parameters associated with acquisition of the first type of signal block for said frequency, the revisited frequency being the same as said frequency.

2. The receiver according to claim 1, wherein the first format is a terrestrial digital video broadcast format, and the second format is a mobile digital video broadcast format.

3. The receiver according to claim 2, wherein the terrestrial digital video broadcast format is DVB-T2, and the mobile digital video broadcast format is DVB-NGH.

4. The receiver according to claim 1, wherein the first format is a mobile digital video broadcast format, and the second format is a terrestrial digital video broadcast format.

5. The receiver according to claim 4, wherein the terrestrial digital video broadcast format is DVB-T2, and the mobile digital video broadcast format is DVB-NGH.

6. The receiver according to claim 1, wherein the data relating to each said estimated one or more parameters includes data relating to a state of one or more processes of the receiver.

7. The receiver according to claim 1, wherein the data stored for said frequency for a signal of a first type is used to initialize an estimate of one or more signal parameters for said frequency for a signal of the second type.

8. The receiver according to claim 1, wherein the receiver is configured to receive the interleaved signals of both the first and second types from successive ones of a plurality of frequencies, including said frequency, in a time-frequency slicing scheme.

9. The receiver according to claim 1, wherein the receiver is configured to extract from the signal block of the first type a sub-block of data corresponding to a respective service.

10. A method of receiving a first type of signal formatted according to a first format, wherein the first type of signal block is interleaved with a second type of signal block formatted according to a second format, the method comprising:
estimating, from received signals of the first type, one or more signal parameters associated with acquisition of the first type of signal block at a frequency;
storing, in memory, data relating to each said estimated one or more signal parameters associated with acquisition of the first type of signal block for said frequency; and
initializing signal parameter estimation for subsequent received signals at a revisited frequency based on the stored data relating to each said estimated one or more signal parameters associated with acquisition of the first type of signal block for said frequency, the revisited frequency being the same as said frequency.

11. The method according to claim 10, wherein the data relating to each said estimated one or more parameters includes data relating to a state of one or more processes of a receiver.

12. The method according to claim 10, further comprising:
initializing an estimate of one or more signal parameters for a respective frequency for a signal of the second type using the data stored for said frequency for a signal of the first type.

13. The method according to claim 10, further comprising:
receiving the interleaved signals of both the first and second types from successive ones of a plurality of frequencies, including said frequency.

14. The method according to claim 10, further comprising:
extracting from the signal block of the first type a sub-block of data corresponding to a respective service.

15. The method according to claim 10, wherein the stored data relates to one or more selected from the list consisting of:
power of the signal;
a frequency offset of the signal;
a timing offset of the signal; and
a noise profile of the signal.

16. A non-transitory computer-readable storage medium storing computer-readable instructions that, when executed by a computer, cause the computer to perform a method comprising:
estimating, from received signals of the first type, one or more signal parameters associated with acquisition of the first type of signal block at a frequency;
storing, in memory, data relating to each said estimated one or more signal parameters associated with acquisition of the first type of signal block for said frequency; and
initializing signal parameter estimation for subsequent received signals at a revisited frequency based on the stored data relating to each said estimated one or more signal parameters associated with acquisition of the first type of signal block for said frequency, the revisited frequency being the same as said frequency.

17. The receiver according to claim 1, wherein the receiver is comprised of only one tuner.

18. The receiver according to claim 1, wherein the receiver cannot fully decode the second type of signal block formatted according to the second format.

19. The receiver according to claim 1, wherein the stored data relates to one or more of the following:
power of the first type of signal block,
a frequency offset of the first type of signal block,
a timing offset of the first type of signal block, and
a noise profile of the first type of signal block.

20. The receiver according to claim 1, wherein the revisited frequency is a frequency immediately preceded by a different frequency associated with acquisition of the first type of signal block at the different frequency.

* * * * *